United States Patent [19]
Muratani et al.
[11] 3,716,802
[45] Feb. 13, 1973

[54] PHASE LOCKED LOOP WITH RAPID PHASE PULL-IN CIRCUIT

[75] Inventors: Takuro Muratani, Michihisa Okawa, Hiroshi Nakamura, all of Tokyo, Japan

[73] Assignee: Kokusai Denshin Denwa Co., Ltd., Tokyo, Japan and Fujitsu Limited, Kawasaki, Japan

[22] Filed: April 5, 1971

[21] Appl. No.: 131,047

[30] Foreign Application Priority Data

April 10, 1970 Japan ....................45/30548

[52] U.S. Cl. ....................331/8, 331/12, 331/14, 331/17, 331/26, 331/36 C
[51] Int. Cl. ....................H03b 3/04
[58] Field of Search ......331/11, 12, 14, 26, 36 C, 17, 331/8

[56] References Cited

UNITED STATES PATENTS 3,336,534 8/1967 Gluth ....................331/12
3,600,700 8/1971 Matsuo ....................331/12
3,605,033 9/1971 Nakamura ....................331/12

*Primary Examiner*—Roy Lake
*Assistant Examiner*—Siegfried H. Grimm
*Attorney*—Curt M. Avery, Arthur E. Wilfond, Herbert L. Lerner and Daniel J. Tick

[57] ABSTRACT

In a loop comprising a phase detector, a low pass filter and a voltage-controlled oscillator, the phase of the output oscillation of the oscillator is synchronized with the phase of the input signal supplied to the loop. Prior to the supply of the input signal to the loop, the phase of the input signal is compared with the phase of the loop by an additional phase detector. If necessary, the phase of the voltage-controlled oscillator in the loop is varied by the additional phase detector so that the phase of the stable point of the loop approaches the phase of the input signal. The input signal is then applied to the loop and the synchronization operation is provided.

7 Claims, 8 Drawing Figures

PHASE LOCKED LOOP WITH RAPID PHASE PULL-IN CIRCUIT

DESCRIPTION OF THE INVENTION

The invention relates to a phase synchronizing circuit. More particularly, the invention relates to a phase synchronizing circuit having a loop comprising a phase detector, a loop filter and a voltage-controlled oscillator. The phase synchronizing circuit is able to perform a complete pull-in at a high speed due to the elimination of faults in the phase pull-in as a result of a pseudo stable point.

In prior art systems there is a disadvantage in that the pull-in from the initial phase near $\pi$ radians cannot be performed rapidly. Furthermore, the closer the initial phase is to the point of $\pi$ radians, the longer the pull-in time. This fault in pull-in is thus a considerable problem in, for example, satellite communications systems of time division multiple access, hereinafter identified as TDMA systems, wherein signals in the form of bursts are dealt with and the code error rate must be kept to under $10^{-4}$. When a phase synchronizing circuit is utilized, for example, as a carrier wave regenerating circuit or as a bit clock regenerating circuit in the demodulator of a PCM–PM–TDMA communications system wherein the information is pulse code modulated, and furthermore the carrier wave is phase modulated, there is a specific probability of occurrence of a fault in the phase pull-in due to the initial phase. The synchronizing carrier wave or the bit clock wave in the foremost section of a burst is thus prevented from normal regeneration and the signals cannot be demodulated.

The principal object of the invention is to eliminate the aforedescribed faults in the pull-in from a point near the pseudo stable point in the phase synchronizing circuit and thereby achieve very stable phase synchronization.

An object of the invention is to provide very stable phase synchronization with efficiency, effectiveness and reliability.

In accordance with the invention, faults in the phase pull-in of the initial phase are eliminated even when the C/N, or carrier wave to noise, ratio is bad, so that a very stable phase synchronizing circuit is provided.

In accordance with the invention, a phase synchronizing circuit having a loop with a pseudo stable point comprises a phase detector having inputs and an output, a loop filter and a voltage-controlled oscillator having an input and an output, input means connected to the phase detector for supplying to the phase detector a phase modulated wave input signal of n phases, wherein $n$ is an integer corresponding to the number of phases of the input signal, coupling means connecting the output of the oscillator to an input of the phase detector, the phase detector comparing the phase of the output oscillation of the oscillator with the phase of the input signal, the output of the phase detector being coupled to the input of the oscillator so that the output voltage of the phase detector controls the frequency of oscillation of the oscillator in proportion to the phase difference between the oscillation and the input signal. The phase synchronizing circuit comprises an additional phase detector connected between the input means and the oscillator. Phase shifting means connected between the oscillator and the additional phase detector shifts the phase of the output of the oscillator. The additional phase detector compares the phase of the input signal with the phase of the shifted output of the oscillator prior to the supply of the input signal to the phase detector. Additional coupling means connecting the output of the additional phase detector to the oscillator shifts the phase of the oscillator by substantially $\pi/n$ radians when the phase of the input signal is near the pseudo stable point of the loop. Input control means is connected to and controls the input means for supplying the input signal to the loop after the shifting of the phase of the oscillator.

The phase shifting means may comprise a phase shifter connected between the output of the oscillator and the additional phase detector.

The phase shifting means may comprise a ring modulator connected to the output of the oscillator and a phase shifter connected between the output of the ring modulator and the additional phase detector.

The additional coupling means includes discriminator means having an input connected to the output of the additional phase detector and an output and pulse generator means connected between the output of the discriminator means and the input of the oscillator.

The additional coupling means comprises discriminator means having an input connected to the output of the additional phase detector and an output, flip flop means having an input and an output, gate means coupling the output of the discriminator means to the input of the flip flop means and drive amplifier means connected between the output of the flip flop means and the ring modulator.

The input control means comprises pulse generator means connected to the input means and to the discriminator means.

The input control means comprises pulse generating means connected to the input means, the discriminator means and the gate means.

In order that the invention may be readily carried into effect, it will now be described with reference to the accompanying drawing, wherein.

Figure 7A:
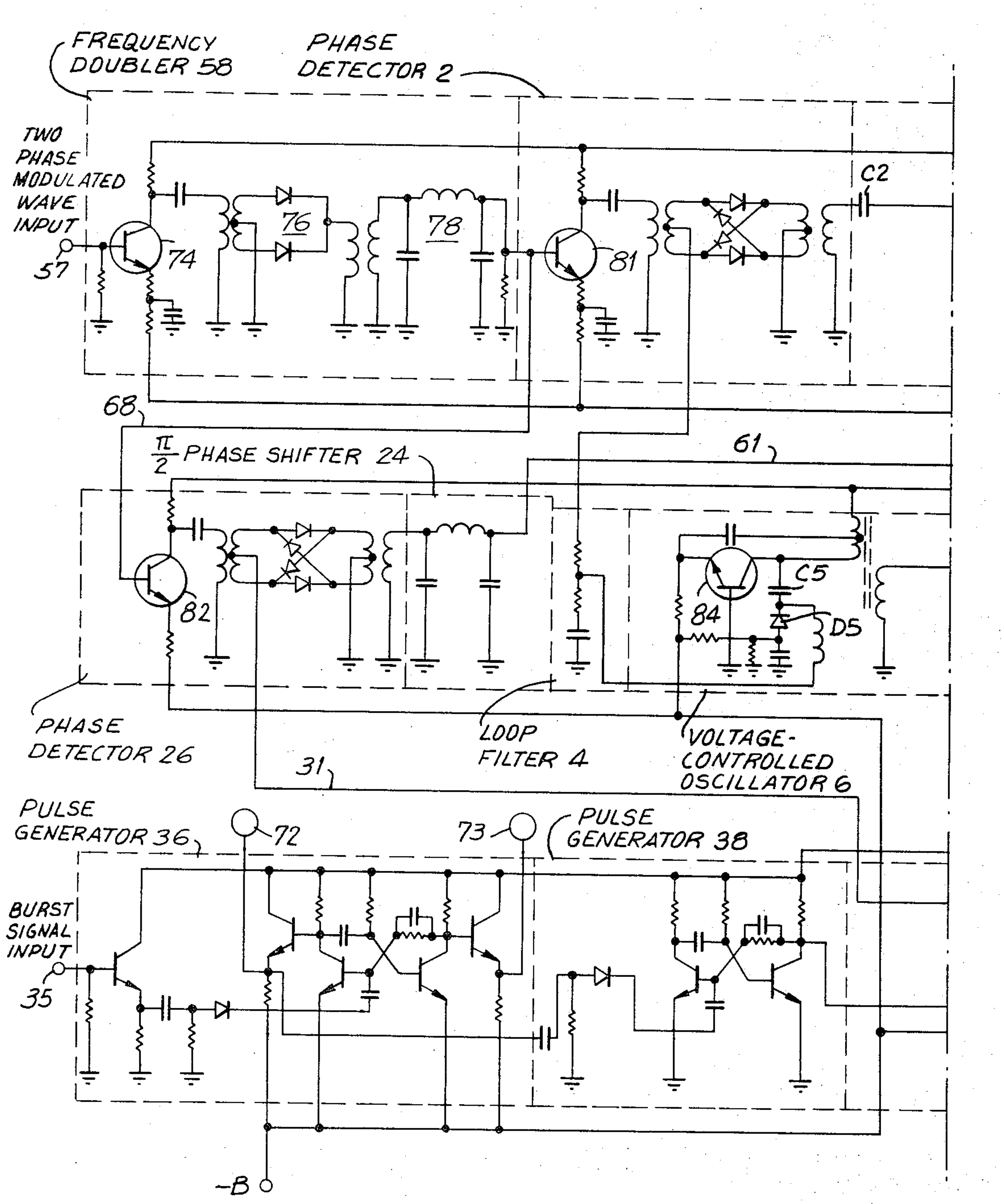
Figure 7B:
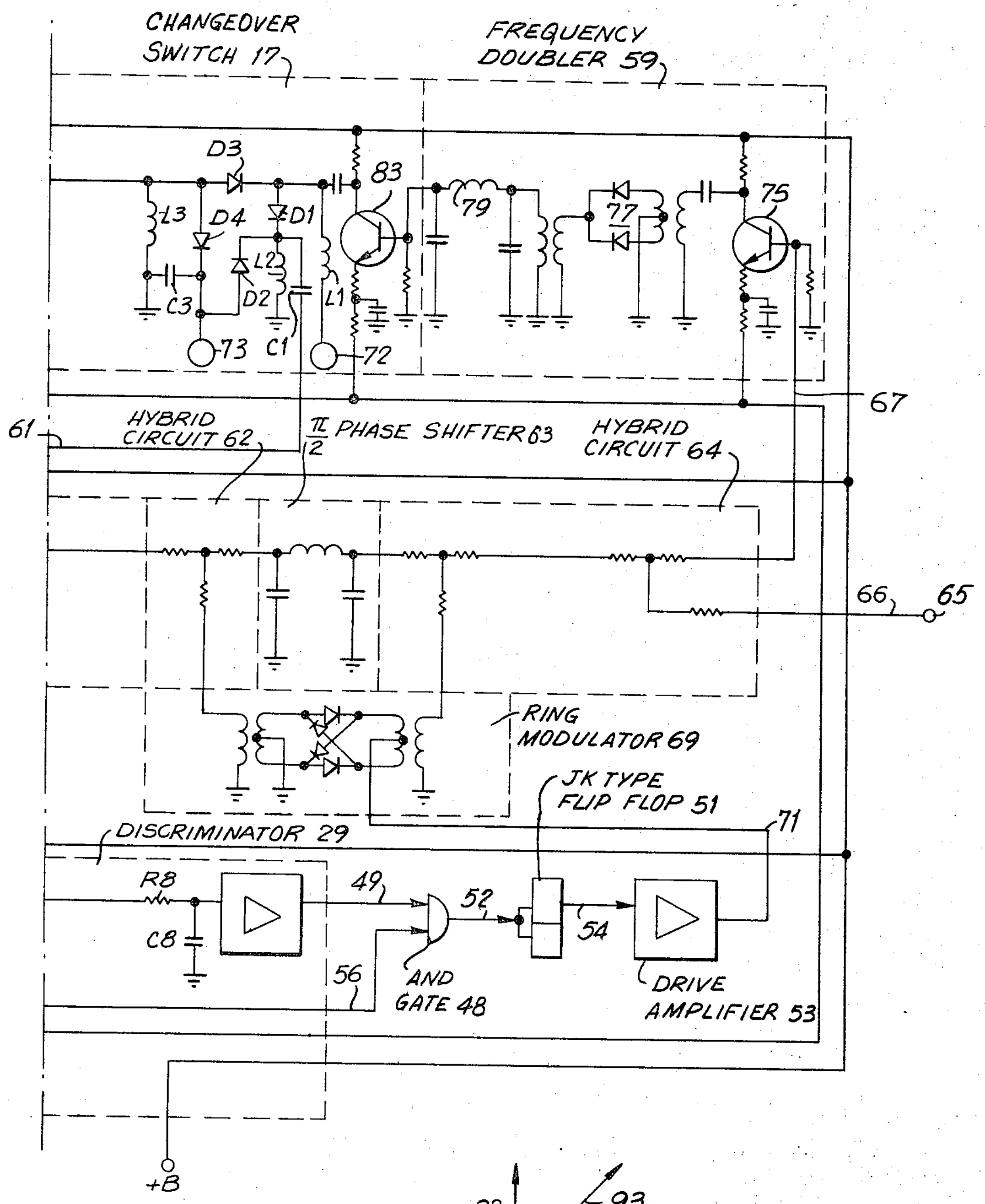
Figure 7B:
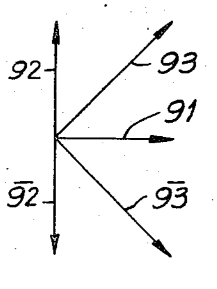

FIG. 7, which is FIGS. 7*a* and 7*b*, is a circuit diagram of still another embodiment of the phase synchronizing circuit of the invention; and FIG. 8 is a vector diagram explaining the operation of the embodiment of FIG. 7.

In the FIGS., the same components are identified by the same reference numerals.

Figure 1:
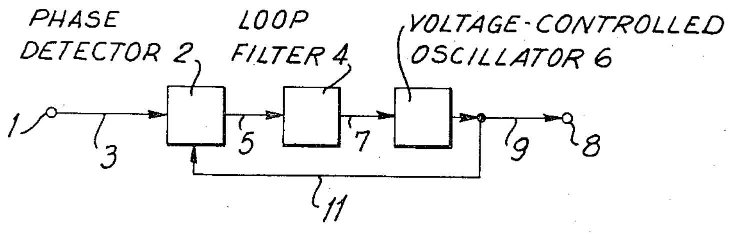
FIG. 1 PRIOR ART
FIG. 1 is a block diagram of a known phase synchronizing circuit.

In the known phase synchronizing circuit of FIG. 1, an input terminal 1 is connected to an input of a phase detector 2 via a lead 3. The output of the phase detector 2 is connected to the input of a loop filter 4 via a lead 5. The output of the loop filter 4 is connected to the input of a voltage-controlled oscillator 6 via a lead 7. The output of the voltage-controlled oscillator 6 is connected to an output terminal 8 via a lead 9 and to another input of the phase detector 2 via a lead 11.

In the phase synchronizing circuit of FIG. 1, the input signal is supplied to the input terminal 1. The difference between the phase of the input signal and the phase of the output oscillation of the voltage-controlled oscillator 6 is detected by the phase detector 2. The voltage-controlled oscillator 6 is controlled by the output of the phase detector 2 to synchronize the phase of the output oscillation of said oscillator with the phase of the input signal.

A detector having a cosine type characteristic is utilized as the phase detector 2 in this type of phase synchronizing circuit. A phase detector having a cosine type characteristic may comprise, for example, a ring modulator. The product of the input signal supplied to the phase detector 2 and the output oscillation of the voltage-controlled oscillator 6 is provided, so that the output characteristic becomes a cosine waveshape.

Figure 2:
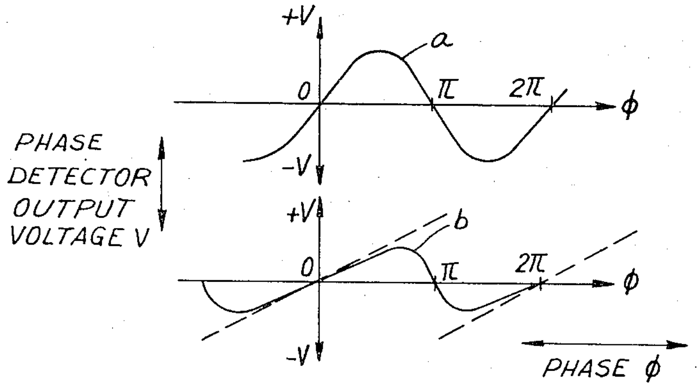
FIG. 2 PRIOR ART
FIG. 2 is a graphical presentation of the output characteristic of the phase detector of the known phase synchronizing circuit of FIG. 1.

The output characteristic of the phase detector 2 of the phase synchronizing circuit of FIG. 1 is shown in FIG. 2. In FIG. 2, the abscissa represents the phase $\phi$ and the ordinate represents the output voltage V of the phase detector. When the phase detector 2 of FIG. 1 has the characteristic shown in curve a of FIG. 2, a stable point is available at the point at which the phase $\phi$ is zero radians and the output voltage is zero volts. It is known that in this case, the pull-in from the initial phase within the range of $\pm \pi/2$ radians may be rapidly performed, but the pull-in from the initial point near $\pi$ radians is performed very slowly.

When the initial phase is at $\pi$ radians, the output of the phase detector 2 of FIG. 1 becomes zero volts. Therefore, there is no control voltage applied to the voltage-controlled oscillator 6. For this reason, such phase, which is the point of $\pi$ radians, becomes a pseudo stable point.

In accordance with the prior art, when it is desired to provide a rapid establishment of the phase, the phase detector utilized as the phase detector 2 is provided with a characteristic of sawtooth waveforms, as shown by the broken lines of curve b of FIG. 2. In this case, however, when the ratio between the carrier wave C of the input signal and the noise N, which is the ratio C/N, is bad, the characteristic of the phase detector 2 becomes misshapen, as illustrated by the full line of the curve b of FIG. 2. Therefore, this method cannot eliminate the defect that the pull-in from the initial phase near $\pi$ radians cannot be rapidly performed. Furthermore, the closer the initial phase is to the point of $\pi$ radians, the longer the pull-in time becomes.

For the foregoing reasons, the fault in pull-in is a considerable problem in, for example, a satellite communication system of a time division multiple access system, or TDMA system, wherein signals in the form of bursts are dealt with, and the code error rate must be kept to a figure less than $10^{-4}$. When a phase synchronizing circuit is utilized, for example, as a carrier wave regenerating circuit or as a bit clock regenerating circuit in the demodulator of a PCM–PM–TDMA communications system, wherein the information is pulse code modulated, and furthermore the carrier wave is phase modulated, faults in the phase pull-in due to the initial phase occur at a specific certainty. Therefore, the synchronizing carrier wave or the bit clock wave in the foremost section of a burst cannot be normally regenerated and the signals cannot be demodulated.

Figure 3:
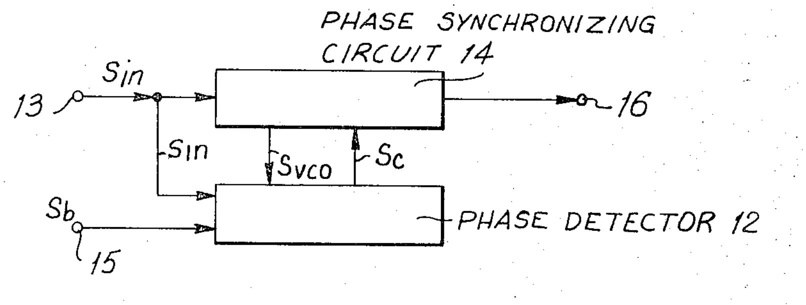
FIG. 3 is a block diagram illustrating the basic principle of the phase synchronizing circuit of the invention.

FIGS. 3 to 8 illustrate practical embodiments of the phase synchronizing circuit of the invention. FIG. 3 illustrates the principle of the phase synchronizing circuit of the invention. In accordance with the invention, as shown in FIG. 3, a phase detector 12 compares the phase of an input signal $S_{in}$ supplied via an input terminal 13 to an input of said phase detector, with the phase of the output oscillation $S_{vco}$ of a phase synchronizing circuit 14. The phase detector 12 detects the phase difference at the first time of the burst. When the phase of the input signal $S_{in}$ is near the pseudo stable point of the phase synchronizing circuit 14, the phase detector 12 produces a control signal $S_c$ which forcibly shifts the phase of the voltage-controlled oscillator of the phase synchronizing circuit 14 by a specific constant magnitude.

When the specific constant magnitude of phase shift of the voltage-controlled oscillator by the control signal $S_c$ of the phase detector 12 is about $\pi/n$ radians, corresponding to the number $n$, which is an integer, of phases of the phase modulated wave of the input signal, the phase of said input signal may be brought to a point near the stable point. As hereinbefore described, rapid phase pull-in may be achieved by shifting the phase of the voltage-controlled oscillator so that the phase of the input signal $S_{in}$ may come to a point near the stable point, and by then constituting the phase synchronizing loop. An input burst signal $S_b$ for controlling the phase detector 12 is supplied via a burst signal input terminal 15 and permits the phase detector to be driven at the beginning of a burst. The output signals are provided at an output terminal 16 of the phase synchronizing circuit 14.

Figure 4:
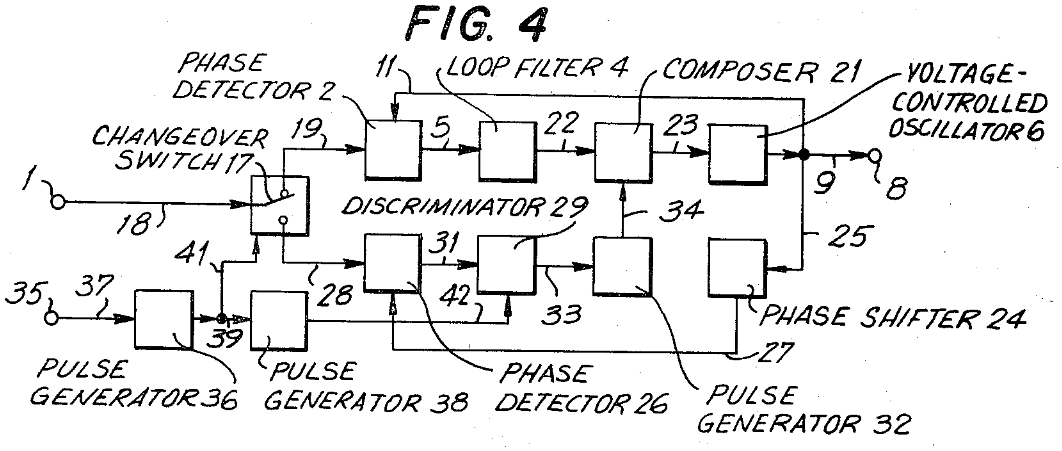
FIG. 4 is a block diagram of an embodiment of the phase synchronizing circuit of the invention.

FIG. 4 illustrates an embodiment of the phase synchronizing circuit of the invention. In FIG. 4, the input terminal 1 is connected to the input of a changeover switch 17 via a lead 18. One output of the changeover switch 17 is connected to an input of the phase detector 2 (FIG. 1) via a lead 19. The output of the phase detector 2 is connected to the input of the loop filter 4 (FIG. 1) via the lead 5. The output of the loop filter 4 is connected to an input of a composer 21 via a lead 22. The composer 21 comprises a hybrid circuit which is the same as the hybrid circuit 64 shown in FIG. *7b* and hereinafter described with reference to FIG. *7b*. The composer 21 adds the two voltages applied to it. The output of the composer 21 is connected to the input of the voltage-controlled oscillator 6 (FIG. 1) via a lead 23. The output of the voltage-controlled oscillator 6 is connected to the output terminal 8 via the lead 9 and to another input of the phase detector 2 via the lead 11.

The output of the voltage-controlled oscillator 6 is connected to the input of a phase shifter 24 via a lead 25. The output of the phase shifter 24 is connected to an input of a phase detector 26 via a lead 27. The other output of the changeover switch 17 is connected to another input of the phase detector 26 via a lead 28. The output of the phase detector 26 is connected to an input of a discriminator 29 via a lead 31. The output of the discriminator 29 is connected to the input of a pulse generator 32 via a lead 33. The output of the pulse generator 32 is connected to another input of the composer 21 via a lead 34.

The input signal is supplied to the input terminal 1. The burst signal is supplied to an input terminal 35 which is connected to the input of a pulse generator 36 via a lead 37. The output of the pulse generator 36 is connected to the input of a pulse generator 38 via a lead 39 and to the changeover switch 17 via a lead 41.

Figure 5:
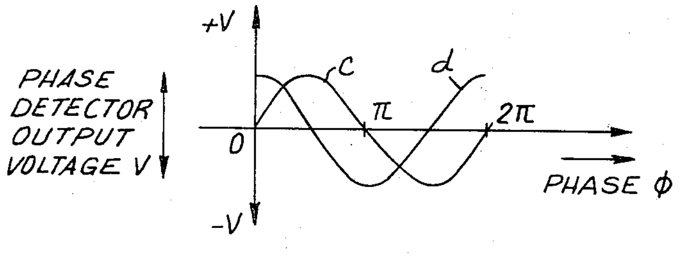
FIG. 5 is a graphical presentation illustrating the operation of the embodiment of FIG. 4.

When the burst signal supplied to the input terminal 35 is "1," the timing is provided by the pulse generator 36 and the changeover switch 17 is switched to the phase detector 26. That is, the changeover switch 17 closes the circuit between the leads 18 and 28. Since the phase shifter 24 is connected in series with the phase detector 26, there may be a phase difference between said phase detector and the phase detector 2. This phase difference is shown in FIG. 5, wherein the abscissa represents the phase $\phi$ and the ordinate represents the phase detector output voltage V. In FIG. 5, curve c illustrates the output voltage V of the phase detector 2 and curve d illustrates the output voltage V of the phase detector 26.

The timing is then provided by the pulse generator 38 and the sign or polarity is discriminated by the discriminator 29, to another input of which the output of said pulse generator is connected via a lead 42. If the output of the phase detector 26 is, for example, negative, the discriminator 29 drives the pulse generator 32 so that said pulse generator produces pulses. The pulse generator 32 is set to such voltage and time duration as will shift the phase of the voltage-controlled oscillator 6 by $\pi$ radians. When the shifting of the phase of the voltage-controlled oscillator 6 is completed, the changeover switch 17 is switched back to its first position in which it closes the circuit between the leads 18 and 19. The input signal is then supplied to the phase detector 2 and the phase synchronizing loop is closed.

When the initial phase is between $\pi/2$ radians and $3\pi/2$ radians in FIG. 5, the output of the phase detector 26 becomes negative, as hereinbefore described. In this case, the phase of the voltage-controlled oscillator 6 is forcibly shifted by $\pi$ radians and it is moved to a point near the stable point. The phase synchronizing loop is then constituted and the phases are synchronized. Integral detection or instantaneous detection utilizing an integrator may be provided in the discriminator 29.

The same operation as hereinbefore described may be provided by substituting a switch which switches the output signals of the voltage-controlled oscillator 6 instead of the changeover switch 17 which switches the input signals. The same effect as hereinbefore described may be provided by switches at the outputs of the phase detectors 2 and 26 and by opening and closing the output circuits of said phase detectors via said switches.

Figure 6:
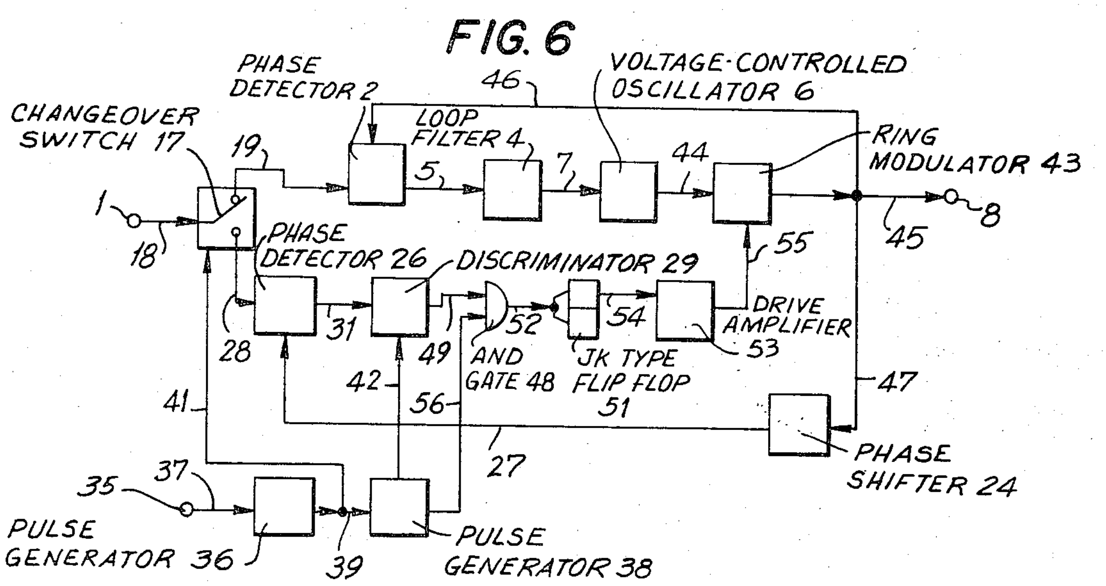
FIG. 6 is a block diagram of another embodiment of the phase synchronizing circuit of the invention.

The pulse generator 32 and the composer 21 of FIG. 4 function to shift the phase of the voltage-controlled oscillator 6 by a constant magnitude. Such phase shifting may also be provided by the circuit arrangement of FIG. 6. In the embodiment of FIG. 6, the input terminal 1 is connected to the input of the changeover switch 17 via the lead 18. The first output of the changeover switch 17 is connected to an input of the phase detector 2 via the lead 19. The output of the phase detector 2 is connected to the input of the loop filter via the lead 5. The output of the loop filter 4 is connected to the input of the voltage-controlled oscillator 6 via the lead 7. The output of the voltage-controlled oscillator 6 is connected to an input of a ring modulator 43 via a lead 44. The output of the ring modulator 43 is connected to the output terminal 8 via a lead 45, to another input of the phase detector 2 via a lead 46, and to the input of the phase shifter 24 via a lead 47.

The output of the phase shifter 24 is connected to an input of the phase detector 26 via the lead 27. The second output of the changeover switch 17 is connected to another input of the phase detector 26 via the lead 28. The output of the phase detector 26 is connected to an input of the discriminator 29 via the lead 31. The output of the discriminator 29 is connected to a first input of an AND-gate 48 via a lead 49. The output of the AND-gate 48 is connected to the inputs of a JK type flip flop 51 via a lead 52. The output of the flip flop 51 is connected to the input of a drive amplifier 53 via a lead 54. The output of the drive amplifier 53 is connected to another input of the ring modulator 43 via a lead 55.

The input terminal 35 is connected to the input of the pulse generator 36 via the lead 37. The output of the pulse generator 36 is connected to the input of the pulse generator 38 via the lead 39 and to the changeover switch 17 via the lead 41. An output of the pulse generator 38 is connected to another input of the discriminator 29 via the lead 42 and another output of said pulse generator is connected to the second input of the AND-gate 48 via a lead 56.

The pulse generator 32 and the composer 21 of the embodiment of FIG. 4 are replaced by the ring modulator 43, the AND-gate 48, the flip flop 51 and the drive amplifier 53 of the embodiment of FIG. 6. The pulse generator 38 produces a sampling pulse for discriminating the sign. The output of the discriminator 29 is detected by the circuit. When the output of the discriminator 29 is "1," that is, when it is necessary to shift the phase of the voltage-controlled oscillator 6, the flip flop 51 is inverted. The phase is shifted $\pi$ radians by the ring modulator 43 via the drive amplifier 53 in accordance with whether the flip flop 51 produces an output signal of "1" to "0."

In the aforedescribed embodiment of FIG. 4, wherein the input voltage is controlled, a specific period of time is required before the phase may be shifted. In the operation of the embodiment of FIG. 6, however, there is the advantage that the phase may be shifted instantaneously.

FIG. 7, which is FIGS. 7*a* and 7*b*, illustrates a carrier wave regenerating circuit of a pulse code modulation, or PCM, phase shift keying, or PSK, type, two phase demodulator to which our invention is applied. FIG. 7 thus illustrates a third embodiment of our invention. In FIG. 7, an input terminal 57 is connected to the input of a frequency doubler 58. The output of the frequency doubler 58 is connected to one input of the phase detector 2. The other input of the phase detector 2 is connected to an output of the changeover switch 17. An input of the changeover switch 17 is connected to the output of a frequency doubler 59. Another output of the changeover switch 17 is connected to the phase shifter 24 via a lead 61. The output of the phase shifter 24 is connected to one input of the phase detector 26. The output of the phase detector 2 is connected to the input of the loop filter 4. The output of the loop filter 4 is connected to the input of the voltage-controlled oscillator 6.

The output of the voltage-controlled oscillator 6 is connected to the input of a hybrid circuit 62. The output of the hybrid circuit 62 is connected to the input of a $\pi/2$ phase shifter 63. The output of the $\pi/2$ phase shifter 63 is connected to the input of a hybrid circuit 64. The output of the hybrid circuit 64 is connected to an output terminal 65 via a lead 66. The input of the frequency doubler 59 is connected to the output of the hybrid circuit 64 via a lead 67. The other input of the phase detector 26 is connected to the output of the frequency doubler 58 via a lead 68. The output of the phase detector 26 is connected to the input of the discriminator 29 via the lead 31. An output of the discriminator 29 is connected to the first input of the AND-gate 48 via the lead 49. The output of the AND-gate 48 is connected to the input of the JK type flip flop 51 via the lead 52. The output of the flip flop 51 is connected to the input of the drive amplifier 53 via the lead 54.

The output of the drive amplifier 53 is connected to an input of a ring modulator 69 via a lead 71. Another input of the ring modulator 69 is connected to an output of the hybrid circuit 62 and the output of said ring modulator is connected to an input of the hybrid circuit 64. The input terminal 35 is connected to the input of the pulse generator 36. The output of the pulse generator 36 is connected to the input of the pulse generator 38. The output of the pulse generator 38 is connected to the second input of the AND-gate 48 via the lead 56. The changeover switch 17 is connected to the pulse generator 36 via internal terminals 72 and 73.

In each of the frequency doublers 58 and 59, the input or local signal is initially amplified by a transistor amplifier 74 and 75, respectively. The transistor amplifier is of common emitter type. Each of the frequency doublers 58 and 59 then doubles the frequency of the amplified signal by a frequency doubler 76 and 77, respectively. Unnecessary harmonics in the outputs of the frequency doublers 76 and 77 are removed by low pass filters 78 and 79, respectively. The amplifiers 74 and 75 may be replaced by other circuit elements and may be removed when the level of the input signal is sufficiently great. Each of the frequency doublers 76 and 77 utilizes two diodes of wideband type. The frequency doubler 77 or the frequency doubler 59 may be replaced by another circuit, since the frequency band of the input signal to said frequency doubler is narrow.

Each of the phase detectors 2 and 26 may comprise a double-balanced mixer utilizing four diodes. In each of the phase detectors 2 and 26, the input signal is supplied to one of two terminals via a common emitter type single stage transistor amplifier 81 and 82, respectively. The local signal, the phase of which has been adjusted, is supplied to the other input terminal. Each of the phase detectors 2 and 26 produces an output signal $e_o = K \cos \phi$, in accordance with the phase difference $\phi$ between the signals supplied to its two input terminals. The same effect may be provided by replacing the transistor amplifier 81 and 82 by appropriate circuits. Furthermore, each of the phase detectors 2 and 26 may comprise any suitable detector circuit which functions in the same manner as the double-balanced mixer, instead of said double-balanced mixer.

The changeover switch 17 supplies the output signal from the frequency doubler 59 to the phase detector 26 via the lead 61, and via the phase shifter 24, and to the phase detector 2, in accordance with the output signal from the pulse generator 36. The input signal in the changeover switch 17 is amplified by a common emitter type single stage transistor amplifier 83. The amplified signal in the changeover switch 17 is supplied from the transistor amplifier 83 to a switching network comprising a plurality of diodes D1, D2, D3, and D4, a plurality of inductors L1, L2, and L3, and a plurality of capacitors C1, C2 and C3.

The pulse generator 36 supplies control signals of opposite polarities to the internal control terminals 72 and 73. If it is assumed that a control signal of positive polarity is provided at the internal control terminal 72 and a control signal of negative polarity is provided at the internal control terminal 73, current flows via the circuit 72, L1, D1, L2, ground and ground, L3, D4, 73. The diodes D1 and D4 are switched to their conductive condition. At such time, the diodes D2 and D3 are reverse biased and are switched to their non-conductive condition. Under these conditions, the output of the transistor amplifier 83 is supplied to the phase shifter 24 via the capacitor C1. If, conversely, a signal of negative polarity is provided at the internal control terminal 72 by the pulse generator 36, and a control signal of positive polarity is provided at the internal control terminal 73 by said pulse generator, a reverse operation to that hereinbefore described is performed and the signal is supplied to the phase detector 2 via the capacitor C2.

The phase shifter 24 is a $\pi/2$ phase shifter, as is the phase shifter 63. A network comprising a capacitance, an inductance and a capacitance, connected in the usual $\pi$ fashion, functions as a low pass filter, but may function as a $\pi/2$ radians phase shifter wherein there is no power loss of signals, when the impedance Z and the angular frequency $\omega$ may be expressed as $$\omega L = R$$

and $$\omega CR = 1$$

Any circuit which is able to provide a $\pi/2$ phase shift may be utilized as the phase shifters 24 and 63, respectively.

Each of the hybrid circuits 62 and 64 functions as a power divider, and each comprises a plurality of resistors interconnected as a T-network. The voltage-controlled oscillator may comprise a Hartley oscillator utilizing a transistor 84. The base electrode of the transistor 84 is connected to a point at ground potential. A variable capacitance diode D5 is connected to the collector electrode of the transistor 84 via a capacitor C5. The capacitance may be varied by varying the voltage between the terminals of the diode D5, thereby controlling the frequency of oscillation of the voltage-controlled oscillator 6. The variable control oscillator 6 may comprise any suitable known circuit.

In a phase-locked loop a filter of $(S + \tau_1)/(S + \tau_2)$ type is generally utilized. A filter of more simple characteristic may be utilized, dependent upon the purpose or use of the phase synchronizing circuit. When the sensitivity of the phase detector 2 and the voltage-controlled oscillator 6 are low, it is possible to connect a direct current amplifier such as, for example, an operational amplifier, in cascade with such circuits. The ring modulator 69 utilizes a double-balanced mixer comprising diodes. The ring modulator 69 varies the phase of the signal sent from the hybrid circuit 62 to the hybrid circuit 64 to zero or $\pi$ radians depending upon the polarity of the signal of the drive amplifier 53.

The pulse generator 36 detects the rising of a burst signal supplied to the input terminal 35 and generates a signal for connecting the changeover switch 17 to the phase detector 26 for a constant period of time $t_1$ after the rise time. The pulse generator 36 may comprise a known type of monostable multivibrator.

The discriminator 29 is an integrated circuit which includes a transistor transistor logic. The discriminator 29 produces an output signal at its output which is the output of the logic level of the transistor transistor logic. The output is "1" when the initial phase is near the pseudo stable point, and is "0" when the initial phase is near the stable point.

The pulse generator 38 produces a sampling pulse for discriminating whether the output of the discriminator 29 is "1" or "0" at the end of the period of time determined by the pulse generator 36. The pulse generator 38 detects the decay of the pulse generator 36 and may comprise a monostable multivibrator of the same type as the pulse generator 36.

The output of the phase detector 26 is integrated by a low pass filter R8, C8 of the discriminator 29. The polarity of the output signal of the filter R8, C8 is discriminated by the integrated circuit connected to the output thereof and comprising the discriminator 29. The integrated circuit of the discriminator 29 produces an output signal "1" or "0" of the transistor transistor logic, depending upon whether the polarity of the input signal is positive or negative. The integrated discriminator circuit 29 may comprise, for example, the unit manufactured by Motorola, Inc. as No. MC1017LG. The equivalent characteristic may also be provided by the use of separate components.

Each of the AND-gate 48, the JK type flip flop 51 and the drive amplifier 53 may comprise an integrated circuit. The drive amplifier 53 converts the transistor transistor logic level into a positive or negative signal. The positive polarity terminal of a direct current voltage source is applied to a +B input terminal and the negative polarity terminal of the direct current voltage source is applied to a −B input terminal. As is well known, the frequency doublers 58 and 59, the phase detector 2, the loop filter 4 and the voltage-controlled oscillator 6 function as a carrier wave regenerating circuit of a doubling system.

The phase shifter 63, the hybrid circuits 62 and 64 and the ring modulator 69 of the embodiment of FIG. 7, function as a phase shifting circuit which provides the same effect as the ring modulator 43 of the embodiment of FIG. 6. In the circuit for regenerating the carrier wave of a two phase, phase shift keying wave, a fault in the pull-in occurs at a point spaced from the stable point by $\pi/2$ radians, because there are two stable points within the interval of $2\pi$ radians. For this reason, when it is discriminated that the initial phase is near the pseudo stable point, the phase must be shifted by $\pi/2$ radians.

When the output of the phase shifter 63 of the phase shifting circuit is expressed by a vector 91, as shown in FIG. 8, the output signal of the ring modulator 69 may be expressed by a vector 92 or $\overline{92}$. The phase shifter 63 shifts the phase by $\pi/2$ radians, so that the output signal of the hybrid circuit 64 may be expressed by a vector 93 or $\overline{93}$. The aforedescribed vectors are shown in FIG. 8. Therefore, each time the flip flop 51 is inverted, shifted or switched, the phase may be shifted by $\pi/2$ radians. Furthermore, as evident from the vector diagram of FIG. 8, the phase shifting circuit may be utilized as the phase shifting circuit of an arbitrary phase angle by varying the length of the vectors $|91|$ and $|92|$ or $|\overline{92}|$ by connecting an attenuator or an amplifier to the phase shifter 63 or to the ring modulator 69.

A stable circuit arrangement which may vary the phase of the voltage-controlled oscillator 6 may be utilized as the phase shifting circuit. The circuit for regenerating the carrier wave of the phase shift keying wave may be applied not only to the two phase doubling system, but also to the circuit for the phase shift keying wave of $n$ phases, wherein $n$ is an integer, and may also be utilized as a carrier wave regenerating circuit of a reverse modulation system.

As hereinbefore described, in accordance with the invention, fault in the phase pull-in of the initial phase is eliminated, even when the C/N ratio of the input signal is bad, so that a very stable phase synchronizing circuit is provided.

While the invention has been described by means of specific examples and in specific embodiments, we do not wish to be limited thereto, for obvious modifications will occur to those skilled in the art without departing from the spirit and scope of the invention.

We claim:

1. A phase synchronizing circuit having a loop with a pseudo stable point comprising a phase detector having inputs and an output, a loop filter and a voltage-controlled oscillator having an input and an output, input means connected to the phase detector for supplying to said phase detector a phase modulated wave input signal of $n$ phases, wherein $n$ is an integer corresponding to the number of phases of the input signal, coupling means connecting the output of the oscillator to an input of the phase detector, said phase detector comparing the phase of the output oscillation of the oscillator with the phase of the input signal, the output of the phase detector being coupled to the input of the oscillator so that the output voltage of the phase detector controls the frequency of oscillation of the oscillator in proportion to the phase difference between said oscillation and the input signal, said phase synchronizing circuit comprising an additional phase detector connected between the input means and the oscillator, phase shifting means connected between the oscillator and the additional phase detector for shifting the phase of the output of said oscillator, the additional phase detector comparing the phase of the input signal with the phase of the shifted output of the oscillator prior to the supply of the input signal to the phase detector, additional coupling means connecting the output of the additional phase detector to the oscillator for shifting the phase of the oscillator by substantially $\pi/n$ radians when the phase of the input signal is near the pseudo stable point of the loop, and input control means connected to and controlling the input means for supplying the input signal to the loop after the shifting of the phase of the oscillator.

2. A phase synchronizing circuit as claimed in claim 1, wherein the phase shifting means comprises a phase shifter connected between the output of the oscillator and the additional phase detector.

3. A phase synchronizing circuit as claimed in claim 2, wherein the additional coupling means includes discriminator means having an input connected to the output of the additional phase detector and an output and pulse generator means connected between the output of the discriminator means and the input of the oscillator.

4. A phase synchronizing circuit as claimed in claim 3, wherein the input control means comprises pulse generator means connected to said input means and to said discriminator means.

5. A phase synchronizing circuit having a loop with a pseudo stable point comprising a phase detector having inputs and an output, a loop filter and a voltage-controlled oscillator having an input and an output, input means connected to the phase detector for supplying to said phase detector a phase modulated wave input signal of $n$ phases, wherein $n$ is an integer corresponding to the number of phases of the input signal, coupling means connecting the output of the oscillator to an input of the phase detector, said phase detector comparing the phase of the output oscillation of the oscillator with the phase of the input signal, the output of the phase detector being coupled to the input of the oscillator so that the output voltage of the phase detector controls the frequency of oscillation of the oscillator in proportion to the phase difference between said oscillation and the input signal, said phase synchronizing circuit comprising an additional phase detector connected to the input means, phase shifting means comprising a ring modulator connected to the output of the oscillator for shifting the phase of the output of said oscillator, the additional phase detector comparing the phase of the input signal with the phase of the shifted output of the oscillator prior to the supply of the input signal to the phase detector, said ring modulator having an output, additional coupling means connecting the output of the additional phase detector to the ring modulator for shifting the phase of the oscillator by substantially $\pi/n$ radians when the phase of the input signal is near the pseudo stable point of the loop, input control means connected to and controlling the input means for supplying the input signal to the loop after the shifting of the phase of the oscillator, and a phase shifter connected between the output of the ring modulator and the additional phase detector.

6. A phase synchronizing circuit as claimed on claim 5, wherein the additional coupling means comprises discriminator means having an input connected to the output of the additional phase detector and an output, flip flop means having an input and an output, gate means coupling the output of the discriminator means to the input of the flip flop means and drive amplifier means connected between the output of the flip flop means and the ring modulator.

7. A phase synchronizing circuit as claimed in claim 6 wherein the input control means comprises pulse generating means connected to the input means, the discriminator means and the gate means.

* * * * *